(12) United States Patent
Brockman et al.

(10) Patent No.: US 7,071,418 B2
(45) Date of Patent: Jul. 4, 2006

(54) CABLE HOLDER

(75) Inventors: Daryl C. Brockman, Shorewood, WI (US); David A. Huebschen, Menomonee Falls, WI (US)

(73) Assignee: Actuant Corporation, Glendale, WI (US)

( * ) Notice: Subject to any disclaimer, the term of this patent is extended or adjusted under 35 U.S.C. 154(b) by 0 days.

(21) Appl. No.: 10/974,295

(22) Filed: Oct. 27, 2004

(65) Prior Publication Data

US 2005/0115739 A1    Jun. 2, 2005

Related U.S. Application Data

(60) Provisional application No. 60/514,927, filed on Oct. 28, 2003.

(51) Int. Cl.
*H01B 17/00* (2006.01)

(52) U.S. Cl. .................. 174/154; 174/157; 248/547; 248/68.1

(58) Field of Classification Search ............ 174/157, 174/155, 154, 138 G; 248/68.1, 74.2, 547
See application file for complete search history.

(56) References Cited

U.S. PATENT DOCUMENTS

| | | |
|---|---|---|
| 799,092 A | 9/1905 | Rosenfeld |
| 3,090,826 A | 5/1963 | Cochran |
| D207,057 S | 2/1967 | Palmer |
| 3,345,029 A | 10/1967 | Palmer |
| 3,363,864 A | 1/1968 | Olgreen |
| 3,861,015 A | 1/1975 | Hooven |
| 3,991,960 A | 11/1976 | Tanaka |
| 4,369,946 A | 1/1983 | Palmer et al. |
| 4,470,179 A | 9/1984 | Gollin et al. |
| 4,775,121 A * | 10/1988 | Carty .................. 248/68.1 |

(Continued)

FOREIGN PATENT DOCUMENTS

DE             465 687         1/1969

(Continued)

OTHER PUBLICATIONS

Thiel, Electronic Fastener Division; Packaging for Kwik-Klip™ Cable Clip, Part No. 2002-2.5; St. Louis, Missouri; admitted prior art.

*Primary Examiner*—Jinhee Lee
(74) *Attorney, Agent, or Firm*—Quarles & Brady LLP

(57) ABSTRACT

A cable fastener for stacking cables has a base that is positioned against the stud on a lower surface of the base, a spine that extends from the upper surface of the base and arms that extend perpendicularly from the spine and define slots between them. The slots have open ends that are closed by a separate L-shaped leg that is hinged to the base adjacent to the end of the lower-most slot so it can be pivoted to a position generally perpendicular to the base and adjacent to the ends of the slots so as to close the slots. The end of the leg distal from the base has a locking member for engaging the uppermost arm or another component of the fastener to lock the leg so as to block the open ends of the slots. The leg is hinged to the base by a living hinge that can be formed in the plastic molding process. On the side of the spine opposite from the arms, a nail guide member extends for nailing the fastener to the stud. The base also has staple or screw fastening features on the side of the arms opposite from the nail guide member.

11 Claims, 3 Drawing Sheets

U.S. PATENT DOCUMENTS

| | | |
|---|---|---|
| 5,067,677 A | 11/1991 | Miceli |
| 5,090,645 A | 2/1992 | Zuercher |
| 5,129,607 A | 7/1992 | Satoh |
| 5,277,387 A | 1/1994 | Lewis et al. |
| 5,639,049 A | 6/1997 | Jennings et al. |
| 5,765,786 A | 6/1998 | Gretz |
| D407,963 S | 4/1999 | Gretz et al. |
| 6,378,813 B1 | 4/2002 | Gretz |
| 6,513,766 B1 | 2/2003 | Gretz |
| 6,517,032 B1 | 2/2003 | Gretz |
| 6,581,884 B1 | 6/2003 | Gretz |
| 6,708,933 B1 * | 3/2004 | Girodo ............... 248/74.2 |

FOREIGN PATENT DOCUMENTS

| | | |
|---|---|---|
| DE | 2431834 A1 | 1/1976 |
| DE | 2622136 C2 | 5/1982 |
| FR | 1311393 | 10/1962 |
| WO | WO97/40305 | 10/1997 |
| WO | WO02/075888 A3 | 9/2002 |

* cited by examiner

CABLE HOLDER

CROSS-REFERENCE TO RELATED APPLICATION

This claims the benefit of U.S. Provisional Patent Application No. 60/514,927 filed Oct. 28, 2003.

STATEMENT CONCERNING FEDERALLY SPONSORED RESEARCH OR DEVELOPMENT

Not applicable.

FIELD OF THE INVENTION

This invention relates to fasteners, clips, staples, and other members for holding elongated articles such as cables, tubes, conduits, hoses, or other articles. In particular, the invention relates to a molded plastic holder securable to studs or other building construction materials for stacking elongated articles, referred to herein as cables.

BACKGROUND OF THE INVENTION

U.S. Pat. No. 5,090,645 contains a description of the need in the art for cable stacking members and provides a cable stacking member with a base plate that is securable by a nail to a stud and extensions parallel to the base plate that extend at one of their ends from a support member that is perpendicular to the base plate. The extensions have spaces between them, and at their ends opposite from the support member, they have arrowhead-like enlargements that are stated to guide electrical cables into the slots and also close the slots partially so as to prevent the cables from being easily released.

The present invention is directed at providing a cable stacking member that can be more easily loaded with cables and that provides a positive lock to retain the cables, and that can be secured to a stud by several alternate means.

SUMMARY OF THE INVENTION

The invention provides a cable fastener for stacking cables that has a base that is positioned against the stud on a lower surface of the base and has a spine that extends from the upper surface of the base generally perpendicular to the base. Arms extend perpendicularly from the spine, generally parallel to the base, and define slots between them that are also generally parallel to the base. On the side of the spine opposite from the arms, a nail guide member extends for nailing the fastener to the stud. The base can also have staple or screw fastening features on the side of the arms opposite from the nail guide member.

The arms in a cable fastener of the invention define slots that have open ends. This facilitates easy loading of the slots between the arms with cables. To retain the cables in the slots, a separate L-shaped leg is hinged to the base adjacent to the end of the lower-most slot so it can be pivoted to a position generally perpendicular to the base and adjacent to the ends of the slots so as to close the slots. The end of the leg distal from the base is preferably provided with a shoulder or other locking member for engaging the upper-most arm or another component of the fastener to lock the leg so as to block the open ends of the slots. Preferably, the leg is hinged to the base by a living hinge that can be formed in the plastic molding process.

The foregoing and other objects and advantages of the invention will appear in the detailed description which follows. In the description, reference is made to the accompanying drawings which illustrate a preferred embodiment of the invention.

DETAILED DESCRIPTION OF THE PREFERRED EMBODIMENT

Figure 1:
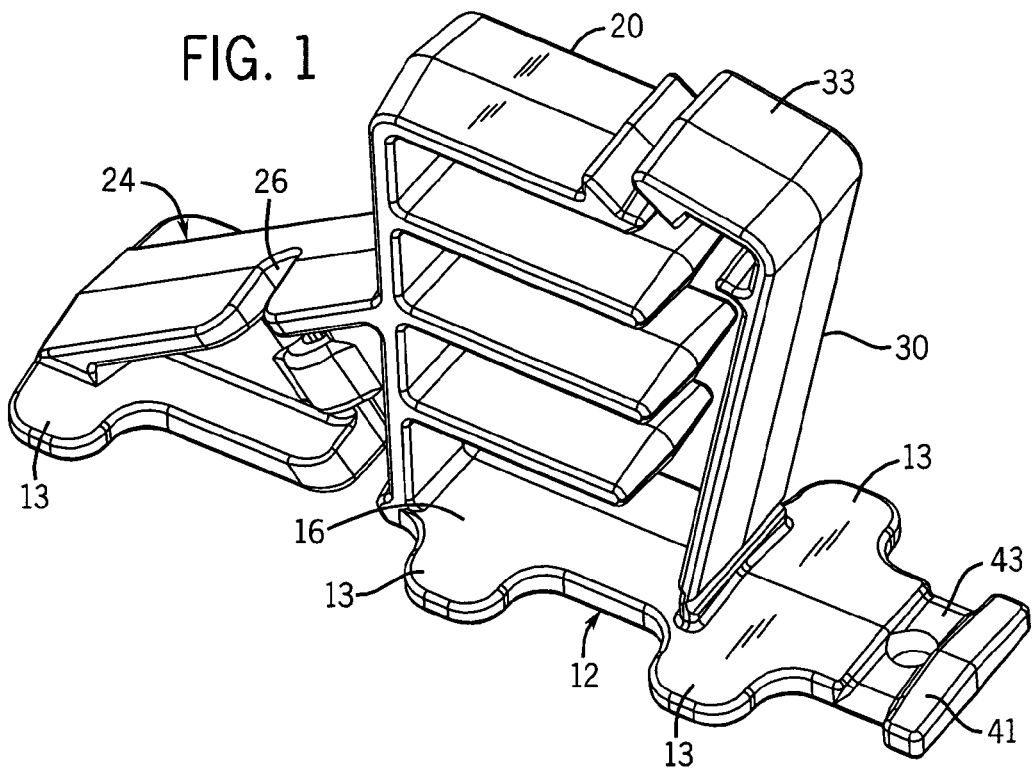
FIG. 1 is a perspective view of a cable fastener of the invention.
Figure 2:
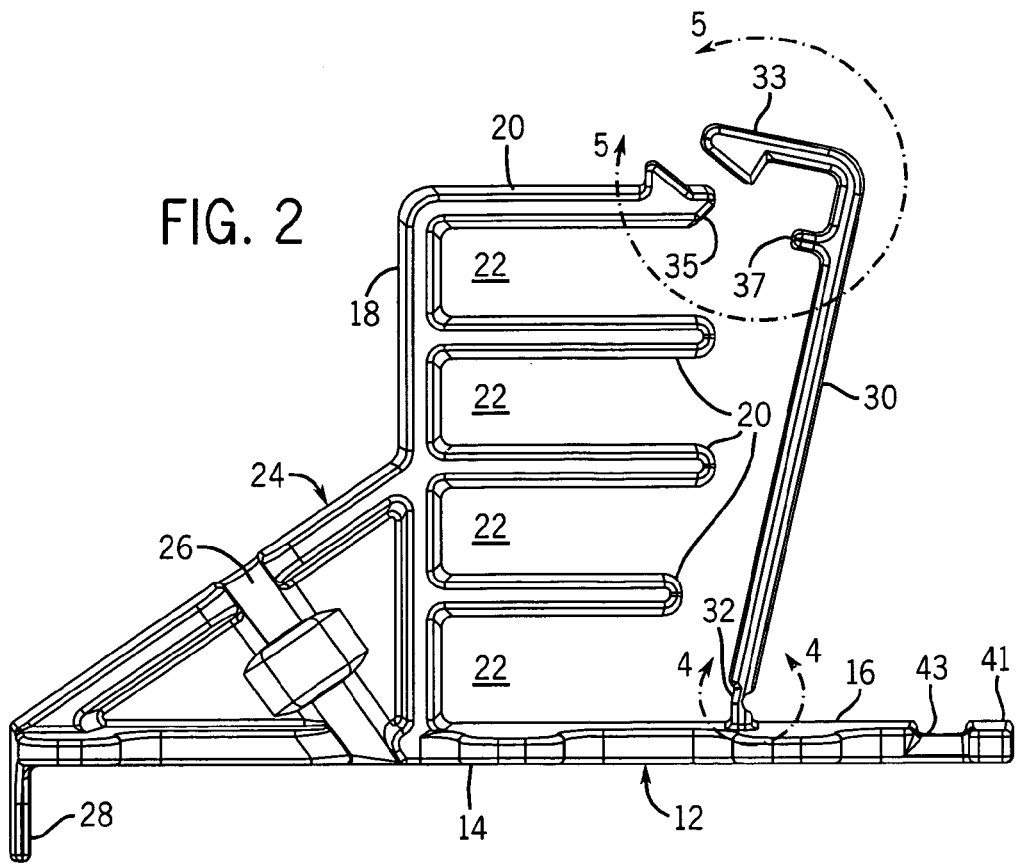
FIG. 2 is a front plan view of the cable fastener of FIG. 1.
Figure 3:
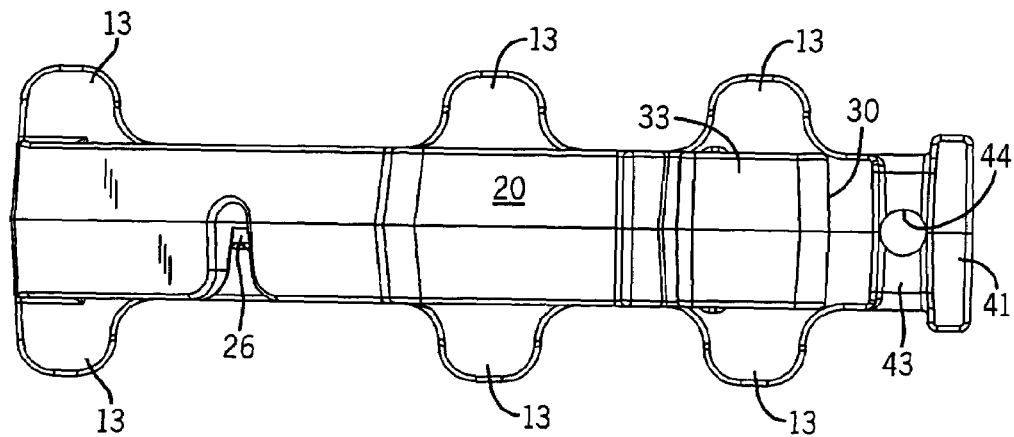
FIG. 3 is a top plan view of the cable fastener of FIG. 2.
Figure 4:
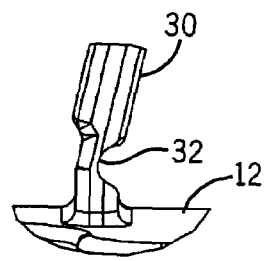
FIG. 4 is a detail view of the living hinge area of the cable fastener of FIG. 2.
Figure 5:
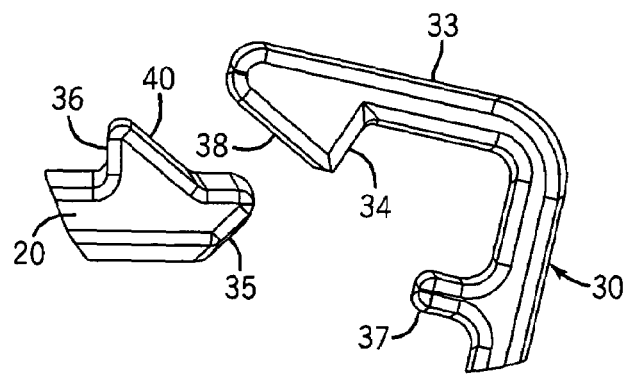
FIG. 5 is a detail view of the snap-fit of the leg to the uppermost arm of the cable fastener of FIG. 2.
Figure 6:
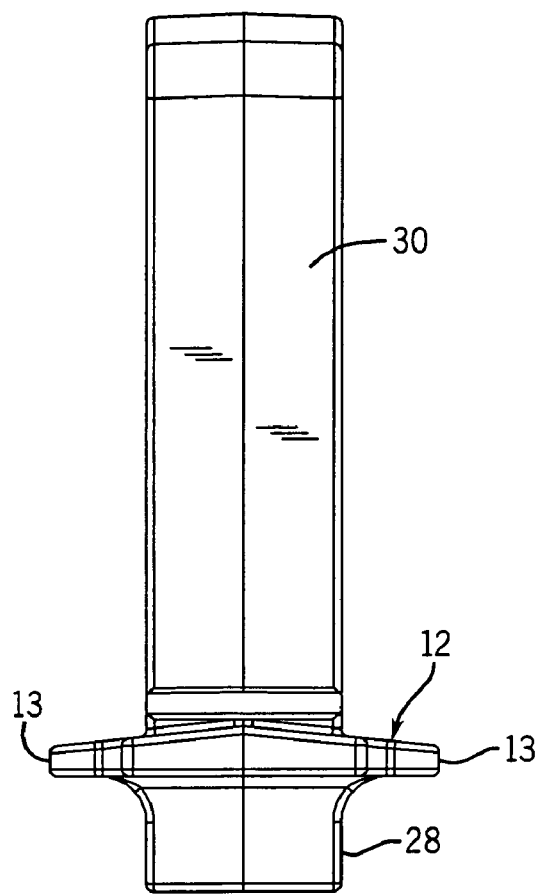
FIG. 6 is an end view from the right end of FIG. 2.
Figure 7:
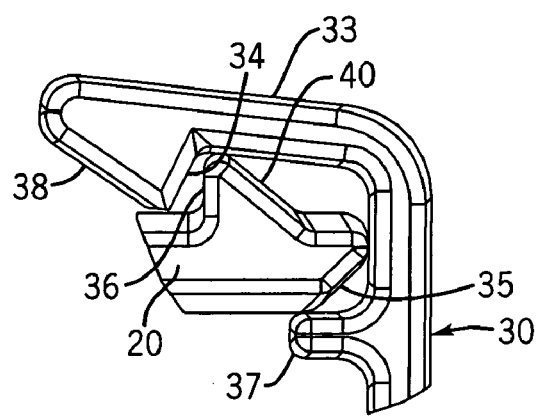
FIG. 7 is a view like FIG. 5 but with the fastener locked.

Referring to FIGS. 1–3, a cable fastener 10 of the invention has a base 12 with wings 13 and a bottom side 14 for laying flat against the face of a stud and a top side 16 from which a spine 18 extends generally perpendicularly. The cable fastener 10 is preferably molded plastic, for example, polypropylene or polyethylene. All of the components described herein of the fastener 10 are preferably integrally molded with one another.

From one side of the spine 18 extend four arms 20 which are vertically spaced apart to define slots 22 between them. The lowest arm 20 is shorter than the other arms to facilitate loading of cables into the lowest slot 22, which is taller than the other slots 22 to accommodate larger cables. From the other side of the spine 18 opposite the arms 20, a generally triangular shaped nail guide 24 extends. The nail guide 24 has a nail hole 26 formed in it through which a nail may be driven down into the stud against which the base 12 lays. The nail hole 26 is formed by well-known plastic molding techniques that have two punches that come in from the front of the fastener 10 and one punch that comes in from the rear, between the two that come in from the front, to form the hole through which the nail extends.

The nail guide 24 also has a tab portion 28 that extends downwardly below the bottom 14 of the base 12 and that can be butted up against the front surface of the stud so as to square up the fastener 10 relative to the stud to which the fastener 10 is to be attached. This positions the fastener at a consistent position relative to the front face of the stud, i.e., immediately adjacent to the front of the stud.

At the ends of the slots 22 opposite from the spine 18, the slots 22 are wide open, the arms 20 not being enlarged at their ends as in prior art cable stacking members. Rather, the slots 22 are wide open so as to facilitate loading elongated articles into them without resistance. To close the ends of the slots 22, a leg 30 is hinged by a living hinge 32 to the base 12 adjacent the open end of the lower-most slot 22 so that the leg 30 can be pivoted into a position in which it is at a substantially right angle to the base 12, in which position it closes the open ends of the slots 22.

The end of the leg 30 opposite from the base 12 is at a substantially right angle to the vertical (in the closed position) part of the leg 30 and has a shoulder 34 formed at its end that can be snap-fit behind a shoulder 36 formed on the top of the upper-most arm 20 to lock the leg 30 in the closed position. The shoulders 34 and 36 also have respective ramped surfaces 38 and 40 which lead to them and cam on one another to facilitate snapping the end of the leg 30 onto the upper-most arm 20 so as to secure it in position, retaining cables in the slots 22. In addition, surface 35 on the end of upper-most arm 20 is ramped so as to cam on the end of projection 37 and direct it to the bottom side of upper-most arm 20 when the leg 30 is closed, so as to capture the end of upper-most arm 20 between the projection 37 and the top 33 of the leg 30.

On the side of the leg 30 opposite from the arms 20, additional stud fastening features are formed in the base 12. These are the staple groove 43, which is formed in the top of the base 12 between wings 13 and projecting portion 41 that projects outwardly from the sides of the base 12, and a screw hole 44 that is formed in approximately the center (from front to back) of the base 12, in the groove 43. A staple can be used to straddle the base anywhere in the area between the rightmost wings (as viewed in FIG. 3) and the projecting portion 41, where the base 12 is of a reduced width, whether the staple is placed in the groove 43 or not. The screw hole 44 is for receiving a self-tapping screw to secure the fastener to a metal stud or other substrate. The hole 44 is made by any suitable plastic molding techniques, for example a slide in the mold can be used to form it, which would be extended and retracted in a direction perpendicular to the parting line of the mold.

A cable fastener of the invention has been described in consideration detail. Such a cable fastener has slots that extend generally parallel to a base of the fastener and that are open at their ends to receive elongated members without hampering the insertion of the elongated members into the slots. An arm is hinged to the base adjacent to the open ends of the slots and is pivotable so as to block the open ends of the slots. The arm is locked into the position in which it blocks the open ends of the slots, preferably by a snap-fit connection. In addition, the fastener preferably includes means for fastening it to a stud at both ends of the fastener, preferably either by a nail, a staple, or a screw.

Many modifications and variations to the preferred embodiment described will be apparent to those skilled in the art. Therefore, the invention should not be limited to the embodiment described.

We claim:

1. A molded plastic cable fastener comprising a generally flat base, a spine extending generally perpendicular from a first surface of the base, arms extending from the spine above the first surface of the base, the base having a second surface opposite from the first surface presenting a generally flat mounting surface, the arms being generally parallel to the base and being spaced apart so as to form slots that are generally parallel to the base, each slot having an open end opposite from the spine that presents an unrestricted entry for insertion of elongated articles into the slot, a leg pivotally connected to the base so as to be pivotable into a position where the leg blocks the open ends of the slots and a lock to hold the leg in the position in which it blocks the open ends of the slots, and a nail guide extending from the middle portion of the spine to the base that defines a fastener hole through the nail guide and the base on one side of the spine.

2. A molded plastic cable fastener as claimed in claim 1, wherein a lower-most one of the arms is shorter than the other arms.

3. A molded plastic cable fastener as claimed in claim 1, further comprising fastening features on a side of the spine opposite from the nail guide.

4. A molded plastic cable fastener as claimed in claim 3, wherein the fastening features include a reduced width portion of the base.

5. A molded plastic cable fastener as claimed in claim 3, wherein the fastening features include a hole through the base.

6. A molded plastic cable fastener as claimed in claim 1, wherein the lock includes an end of the leg with a snap lock feature formed on it.

7. A molded plastic cable fastener as claimed in claim 6, wherein the snap locking feature on the end of the leg mates with a snap lock feature formed on an upper-most arm.

8. A molded plastic cable fastener as claimed in claim 7, wherein the uppermost arm is captured between a projection of the leg and the end of the leg when the leg is locked.

9. A molded plastic cable fastener as claimed in claim 1, wherein the leg is pivotally connected to the base by a living hinge.

10. A molded plastic cable fastener as claimed in claim 1, wherein the base has wings that project laterally from the base.

11. A molded plastic cable fastener as claimed in claim 1, wherein the base has a tab at one end that extends below a bottom surface of the base.

\* \* \* \* \*